United States Patent [19]

Stasik et al.

[11] Patent Number: 5,706,197
[45] Date of Patent: Jan. 6, 1998

[54] CONTINUOUS SELECTION CONTROL FOR SEMI-AUTOMATIC MECHANICAL TRANSMISSION

[75] Inventors: Anthony Stasik, Coppull; Kwok Wah Chan; John Ernest Stainton, both of Chorley, all of England

[73] Assignee: Eaton Corporation, Cleveland, Ohio

[21] Appl. No.: 506,798

[22] Filed: Jul. 25, 1995

[30] Foreign Application Priority Data

Aug. 6, 1994 [GB] United Kingdom ............... 9415965

[51] Int. Cl.$^6$ ............... G06G 7/70; B60K 41/04
[52] U.S. Cl. ............... 364/424.081; 364/424.08; 364/424.093; 364/424.084; 477/115; 477/34; 477/78; 74/335
[58] Field of Search ............... 364/424.08, 424.081, 364/424.082, 424.083, 424.084, 424.085, 424.086, 424.087, 424.088, 424.092, 424.093; 475/158, 123; 74/335, 336 R, 331, 339, 745, 477; 477/63, 65, 73, 102, 120, 129, 78, 124, 70, 904, 34, 68, 115; 340/461, 456, 462, 441

[56] References Cited

U.S. PATENT DOCUMENTS

| | | | |
|---|---|---|---|
| 4,648,290 | 3/1987 | Dunkley et al. | 477/78 |
| 4,735,109 | 4/1988 | Richards et al. | 74/745 |
| 4,800,360 | 1/1989 | Dunkley et al. | 340/456 |
| 4,852,006 | 7/1989 | Speranza | 364/424.084 |
| 4,888,577 | 12/1989 | Dunkley et al. | 340/461 |
| 4,916,979 | 4/1990 | Irwin | 364/424.084 |
| 5,233,523 | 8/1993 | Follmer | 364/424.08 |
| 5,272,939 | 12/1993 | Markyvech et al. | 364/424.08 |
| 5,335,566 | 8/1994 | Genise et al. | 364/424.081 |
| 5,396,420 | 3/1995 | Graf | 364/424.081 |
| 5,444,623 | 8/1995 | Genise | 74/335 |
| 5,459,658 | 10/1995 | Morey et al. | 364/424.085 |
| 5,496,227 | 3/1996 | Minowa et al. | 477/62 |
| 5,523,944 | 6/1996 | Kröger | 364/424.08 |

*Primary Examiner*—Jacques Louis-Jacques
*Attorney, Agent, or Firm*—Howard D. Gordon

[57] ABSTRACT

A control system and method for a vehicular semi-automatic mechanical transmission system (10) is provided for continuously informing the operator of available ratios and for permitting selection of a desired shift ($GR_{T(2)}$), which will be immediately implemented, regardless of the previous selection or ongoing shift implementation, of engagement of a previously selected target ratio ($GR_{T(2)}$). During a shift transient to engage a selected target ratio ($GR_{T(1)}$), the display will show the maximum available upshifts and downshifts from the target ratio, and shift requests will be interpreted as requests for upshifts and downshifts from the initial target ratio ($GR_{T(1)}$) into a new target ratio ($GR_{T(1)}$).

7 Claims, 5 Drawing Sheets

CONTINUOUS SELECTION CONTROL FOR SEMI-AUTOMATIC MECHANICAL TRANSMISSION

BACKGROUND OF THE INVENTION

1. Related Applications

This application claims priority from GB 9415965.4, filed Aug. 6, 1994.

2. Field of the Invention

The present invention relates to a control system and method for a semi-automatic mechanical transmission system, including a manually operated shift selector, for automatically controlling the changing or shifting of transmission gear ratios on a vehicle, while leaving the vehicle driver or operator some residual measure of control. In particular, the present invention relates to a control system and method for the semi-automatic control of a mechanical change gear transmission including means for automatically executing automatically determined and displayed allowable driver selected transmission ratio shifts, including automatic control of the vehicle master clutch. In one embodiment a clutch pedal is provided and the master clutch operation is automated in all but start-from-stop situations, while in other embodiments a fully automatic clutch control is provided and the clutch pedal is eliminated. More particularly, the present invention relates to a system and method for controlling a semi-automatic mechanical transmission wherein movement during automatic implementation of a shift from an engaged ratio to a selected target ($GR_T$), the display will indicate allowable shifts from the target ratio and will interpret shift requests made during a shift transient as requests for upshifts and downshifts from the original target ratio ($GR_{T(1)}$) into a new target ratio $GR_{T(2)}$, and will substantially, immediately cease operations to engage the original target ratio and will commence operations to engage the new target ratio.

DESCRIPTION OF THE PRIOR ART

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Such fully automatic change gear transmissions include transmissions wherein pressurized fluid is utilized to frictionally engage one or more members to other members or to a ground to achieve a selected gear ratio and automated mechanical transmissions utilizing electronic, hydraulic and/or pneumatic logic and actuators to engage and disengage mechanical (i.e., positive) clutches to achieve a desired gear ratio. Examples of such transmissions may be seen by reference to U.S. Pat. Nos. 3,961,546; 4,081,065; 4,361,060; 4,595,986; 5,050,079 and 5,109,729, the disclosures of which are incorporated herein by reference.

Many vehicle operators like to control the selection of the gear ratios, particularly since they can see and/or know the nature of the road ahead and/or of the load being carried. This requirement is satisfied by providing a semi-automatic mechanical transmission control wherein available gear ratios under existing operating conditions are displayed and automatic changing between a plurality of gear ratios is provided while normally permitting the driver to choose when to make a particular gear ratio change and whether to select the immediately consecutive ratio up or down or, by repetitive pulses in a given direction, to skip one or more ratios. Furthermore, the semi-automatic control system prohibits engagement of a driver selected higher ratio (i.e., an upshift) that would cause the engine speed to decrease below the idle speed (i.e., would cause stalling and/or over-stressing at low speeds of the engine) and of a lower ratio (i.e., a downshift) if such a change would cause over-speeding of the engine. Examples of such semi-automatic transmission controls may be seen by reference to U.S. Pats. No. 4,648,290; 4,800,360; 4,930,081 and 4,930,078, the disclosures of which are incorporated herein by reference.

While the above-described semi-automatic mechanical transmission control does provide a very desirable semi-automatic control, the control was subject to improvement. In particular, in the prior art control, for a period beginning (about 300 milliseconds) prior to implementation of a shift into a selected target ratio until completion of the shift into the target ratio, shift requests were not processed and the display of allowable ratios was not altered. This could be less than desirable if, during a shift transient, the vehicle operator had reason to desire engagement of a ratio other than the engaging target ratio.

SUMMARY OF THE INVENTION

In accordance with the present invention, the drawbacks of the prior art semi-automatic mechanical transmission control have been minimized or eliminated by the provision of a control and control method which, upon implementation of a requested shift into a target gear ratio, will display permissible upshifts and downshifts, under current vehicle operating conditions, from the engaging target ratio. This provides the operator with continuous information as to currently available ratios. Further, a shift request made during a shift transient to engage an original target ratio, $GR_{T(1)}$, will be interpreted as a request for upshifts or downshifts from the original target ratio into a new target ratio, $GR_{T(2)}$, and the system will immediately implement that request, if allowable, by ceasing operations to engage the original target ratio and commencing operations to engage the new target ratio.

Accordingly, it is an object of the present invention to provide a new and improved control system/method for semi-automatic mechanical transmissions having a control for automatically determining allowable up and down shifts from a given gear ratio, for automatically displaying same, for automatically executing permissible gear ratio changes upon manual selection thereof, and wherein the operator is continuously informed as to available (allowable) ratios and the operator can, even during a shift into a previously selected target ratio, request a shift into a new target ratio, which request, if allowable, will be substantially, immediately implemented.

This and other objects and advantages of the present invention will become apparent from a reading of the following description of the preferred embodiments taken in connection with the attached drawings.

DESCRIPTION OF THE PREFERRED EMBODIMENT

In the present description of the preferred embodiment, certain terminology will be used for descriptive purposes only and is not intended to be limiting. The terms "upward," "downward," "rightward" and "leftward" refer to directions in the drawings to which reference is made. The terms "inward" and "outward" refer to directions towards and away from, respectively, the geometric center of the device, or portion thereof, being described. The above applies to derivatives of the terms above specifically mentioned and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter-type compound transmission" as used herein will designate a compound transmission wherein the auxiliary transmission is used to provide various selectable steps for subdivisions of the gear ratio selected in the main transmission portion. In a splitter-type compound transmission, the main transmission section is typically provided with relatively wide steps which are split or subdivided by the auxiliary section. The term "upshift" as used herein shall mean the shifting from a lower speed gear ratio into a higher speed gear ratio. The term "downshift" as used herein shall mean the shifting from a higher speed gear ratio to a lower speed gear ratio. The terms "low speed gear", "low gear" and/or "first gear" as used herein shall designate the gear ratio utilized for lowest forward speed operation in a transmission or transmission section (i.e., that set of gears having the highest ratio of reduction relative to the input shaft of the transmission).

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one and two ratios, respectively, from fourth and fifth speed, respectively, in the downshift direction.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924, 484; 4,192,196; 4,440,037 and 4,735,109, the disclosures of which are incorporated herein by reference. Transmissions of the type illustrated in above-mentioned U.S. Pat. No. 4,754,665 also may be advantageously used in connection with the present invention.

The semi-automatic transmission system to which the present invention is particularly advantageously related, is described and illustrated in aforementioned U.S. Pat. No. 4,648,290.

Figure 1:
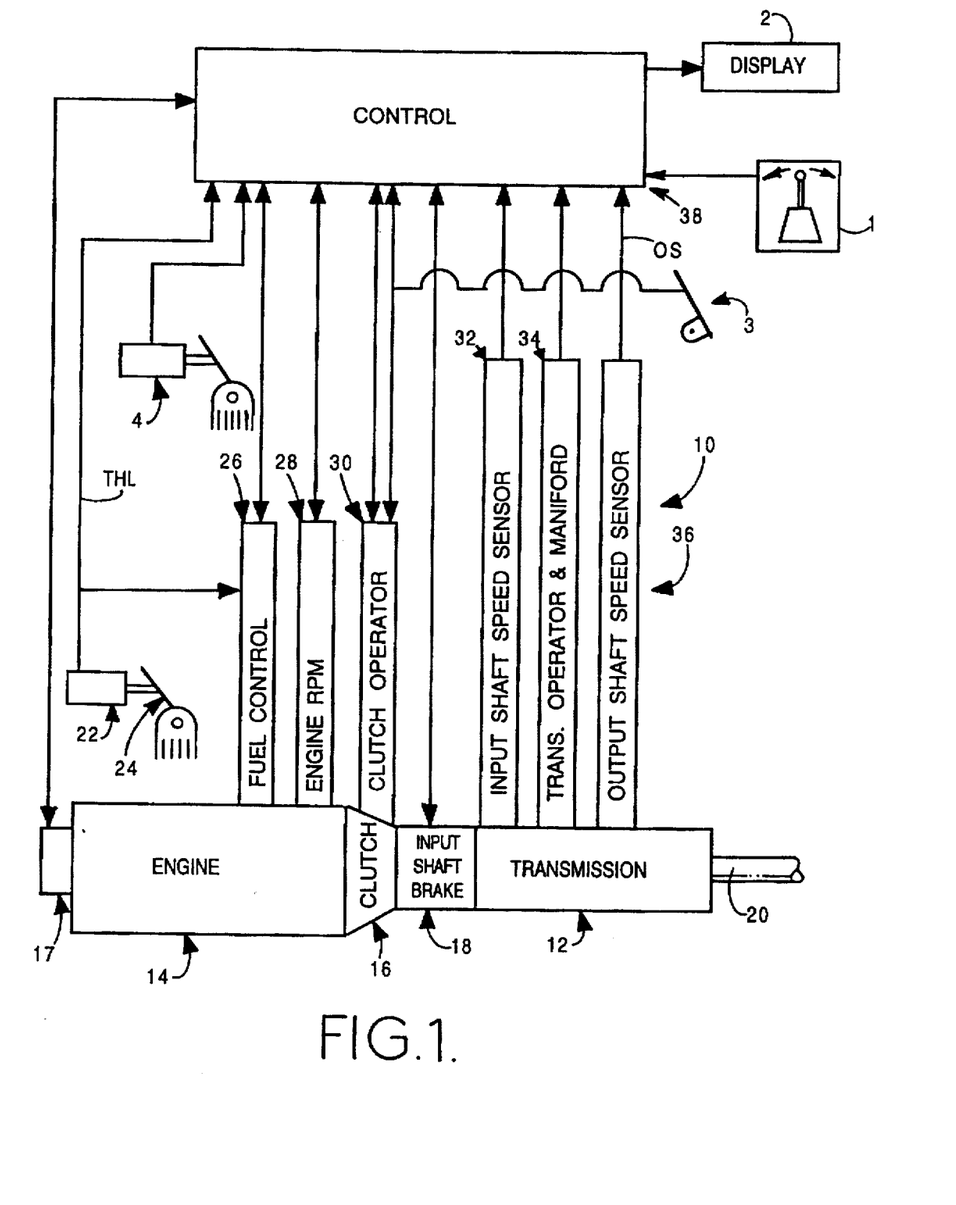
FIG. 1 is a schematic illustration of the semi-automatic mechanical change gear transmission system of the present invention.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that transmission output shaft speed is an indication of vehicle ground speed and engine speed is an indication of transmission input shaft speed, and vice versa, especially if clutch 16 is non-slippingly engaged, while transmission output shaft speed is an indication of vehicle speed.

The throttle position sensor 24 may be of the type illustrated in U.S. Pat. No. 4,922,425, the disclosure of which is incorporated herein by reference, which will indicate the presence or absence of the operator's foot on the throttle pedal as well as displacement of the throttle pedal.

Devices, such as throttle position sensor assembly 22, for sensing the operator setting of a throttle pedal 24, or the like, and providing a signal proportional to, or at least indicative of, the monitored setting, and so called "remote fuel control" or "fly by wire" systems utilizing same, are known in the prior art and illustrated in U.S. Pats. Nos. 4,250,845; 4,305, 359; 4,319,658 and 4,461,254, the disclosures of which are hereby incorporated by reference.

For control of vehicle SAMT systems 10, such as the systems illustrated in above-mentioned U.S. Pat. Nos. 4,648, 290; 4,551,802; 4,361,060 and 4,081,065, it is important to provide accurate input signals to central processing unit, or control, 38, indicative of the operator's positioning of the throttle. The setting is usually expressed as a percentage of wide-open or full throttle with the idle position being zero percent (0%) and full or maximum throttle being one hundred percent (100%).

Figure 2:
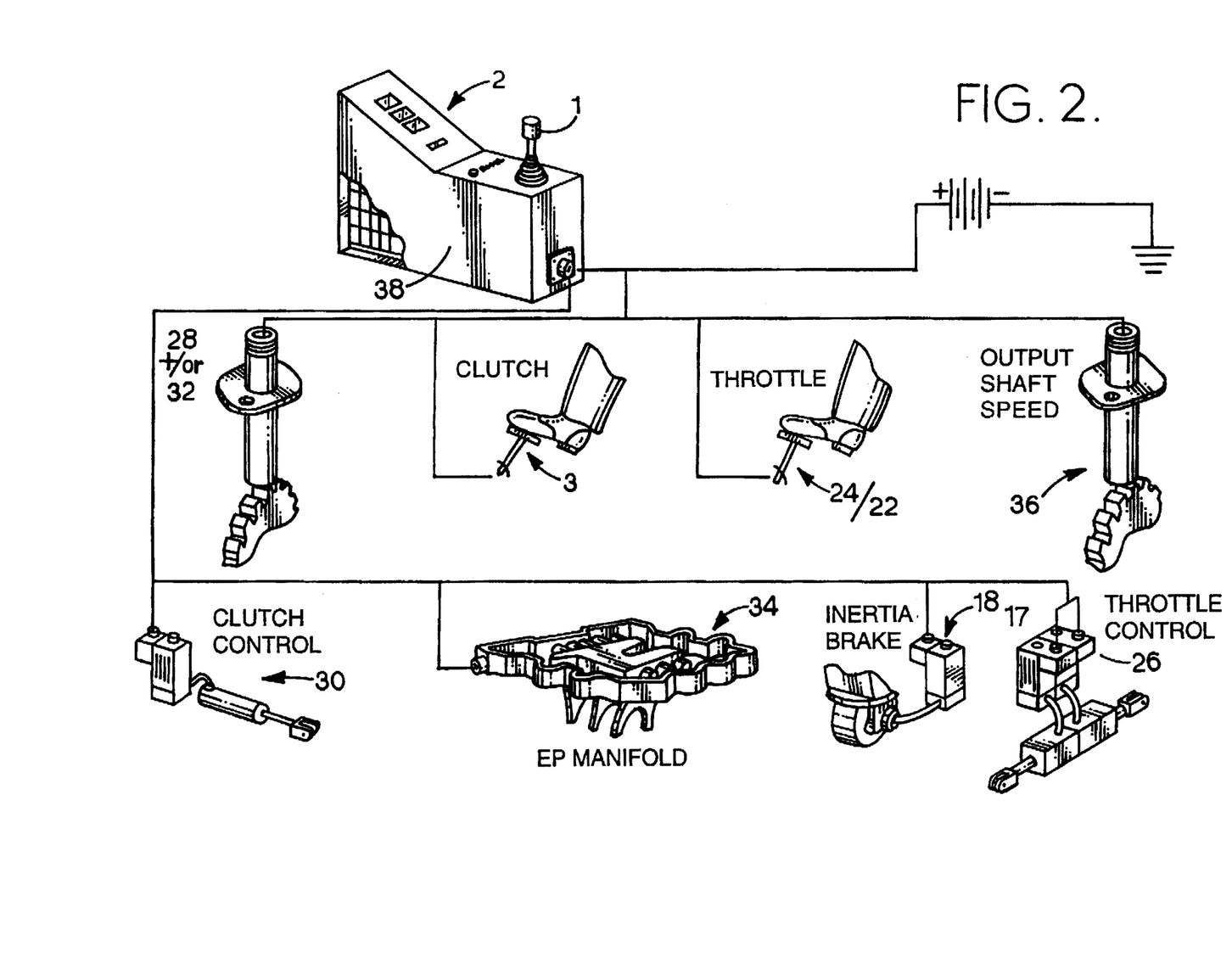
FIG. 2 is a schematic illustration of the control system of the semi-automatic transmission of the present invention.

Control logic circuits, sensors, and actuators for the transmission system 10 as disclosed in FIGS. 1 and 2, may be as disclosed in above-mentioned U.S. Pat. Nos. 4,361, 060; 4,595,986; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The transmission operator 34 may be of the "X-Y" type as illustrated in U.S. Pat. Nos. 4,873,881 and 4,899,607, the disclosures of which are incorporated herein by reference.

The central processing unit also sends command output signals to the display 2 to be described in greater detail below. The semi-automatic transmission system 10 may additionally comprises a usual foot operated manual clutch control 3 intended for use only for start from rest and/or low speed creeping maneuvering situations. The control 38 receives signals indicative of manual clutch control 3 position and of actuation of the vehicle brakes 4. Alternatively, the master clutch could be fully automatically controlled and clutch pedal 3 eliminated. The semi-automatic mechanical transmission system 10 also includes sources of electric and/or pneumatic power (not illustrated).

The central processing unit may be of the type illustrated in U.S. Pat. No. 4,595,986 and may incorporate fault detection and tolerance logic of the type illustrated in U.S. Pat. Nos. 4,849,899; 4,899,279 and 4,945,484, the disclosures of all of which are incorporated herein by reference.

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Engine 14 may be electronically controlled and may communicate over an electronic data link conforming to SAE J1922, SAE J1939 and/or ISO 9141 protocols.

Figure 3A:
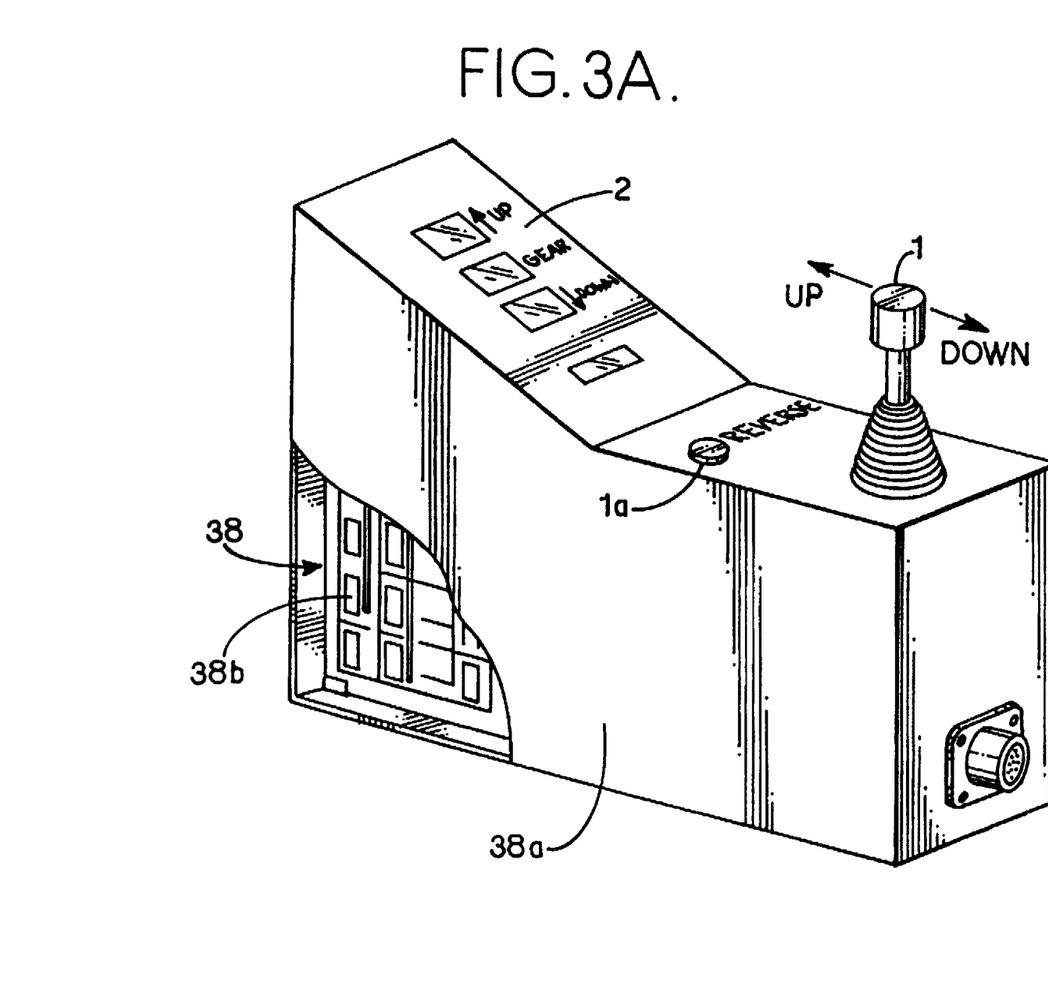
FIG. 3A is a perspective view of the driver's manual shift control and display device.

As may be seen by reference to FIG. 3A, the central processing unit 38 may be contained in a box or housing 38A, which housing carries the display panel 2 having an upshift indicator display 2', a downshift indicator display 2", and a currently engaged gear ratio display 2'", the shift select lever 1, an optional reverse enable button 1A, as well as a central processing unit electronic circuitry 38B.

The schematics of the control system of the semi-automatic mechanical transmission system 10 are also illustrated in FIG. 2.

Figure 3B:
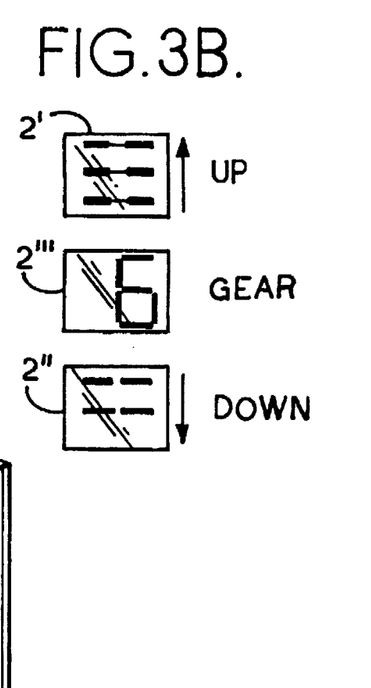
FIG. 3B is an enlarged view of a portion of the display illustrated in FIG. 3.

Referring to FIG. 3B, the display 2 includes upshift indicator section 2', downshift indicator section 2" and currently engaged gear ratio indicator section 2'". As illustrated, the currently engaged gear ratio display section 2'" is presently displaying a "6" indicating that the vehicle transmission is operating in sixth gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh, eighth or ninth speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth or to fourth gear.

Briefly, the permissibility of a possible upshift or downshift is determined by comparing the expected engine speed at the completion of such an upshift or downshift, assuming a substantially constant vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permissible and as to which upshifts and downshifts are impermissible. Should the driver not heed the warning, the central processing unit 38 will not generate impermissible shift command even though synchronization of the mechanical jaw clutch elements could be obtained by the system.

To shift transmission 12, the driver moves lever 1 forward (for upshifts) and rearward (for downshifts) from the position illustrated in FIGS. 2 and 3. To select a single upshift (i.e., a shift to seventh gear), the operator will move lever 1 forward once and the lever will then return to the neutral or centered position under bias. If, in sixth gear as shown, the operator moves the lever forward three times in quick succession, then allowing its return to rest, he will skip two gears in effect, and achieve a skip shift directly into ninth speed (i.e., seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38.

The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation. Alternatively, a separate reverse selector may be provided.

Upshifts and/or downshifts involving both the main and auxiliary section (i.e., compound shifts) are equally simple for the driver to achieve as are those involving only the auxiliary section (i.e., a split shift). In those transmissions provided with multiple reverse gear ratios, the transmission may be downshifted into lower reverse ratios and upshifted into higher reverse ratios by movement of the control lever backward and forward as indicated. Of course, any type of toggle switch or button which may be located on the end of the shift lever may be utilized in place of reverse enable button 1A.

It is understood that a single control lever moveable forward and backward in a given direction to select a forward and reverse mode of operation, and then moveable in a transverse direction to select upshifts and downshifts either single or multiple, of the type disclosed in U.S. Pat. No. 4,442,730, the disclosure of which is hereby incorporated by reference, may be substituted for the control lever 1 illustrated.

It is another important and advantageous feature of the semi-automatic control system of the present invention that, whenever the vehicle in forward motion, neutral is not selected and, if provided, the clutch pedal is not depressed, the operator is continuously advised of allowable ratios, under current vehicle operating conditions, and may select, and immediately have initiated, a shift into any allowable ratio. There is not a "point of no return" beyond which the operator must await completion of a previously selected and/or initiated shift before selecting and/or having initiated a shift into a different target ratio.

Referring again to FIG. 3B, assume the operator selects a single upshift into seventh, the control will immediately implement a shift from the currently engaged ratio (sixth) into the initial target ratio (seventh). If vehicle speed (OS) remains substantially constant, the allowable upshift display section 2' will show two lines to indicate that two upshifts from the current target ratio (seventh) are available, and the allowable downshift display 2" will be caused to show three lines to indicate that a downshift of one, two or three ratios from the target ratio are allowable. The currently engaged ratio section 2'" may be caused to remain at the "6" display or moved to a flashing "7" display, depending upon system user preference.

Continuing with the foregoing example, if, during implementation of the selected shift into seventh, the operator decides that operation in fifth is more appropriate and causes a double displacement of selector lever 1 in the downshift direction, the controller will interpret this as a request for a direct-skip-double downshift from the initial target ratio ($GR_{T(1)}$=seventh) to a new target ratio ($GR_{T(2)}$=fifth) and, as fifth is an allowable gear ratio under current vehicle operating conditions, will immediately issue commands causing fifth speed to be engaged and will cease issuing commands intended to cause the engagement of seventh speed.

Figure 4A:
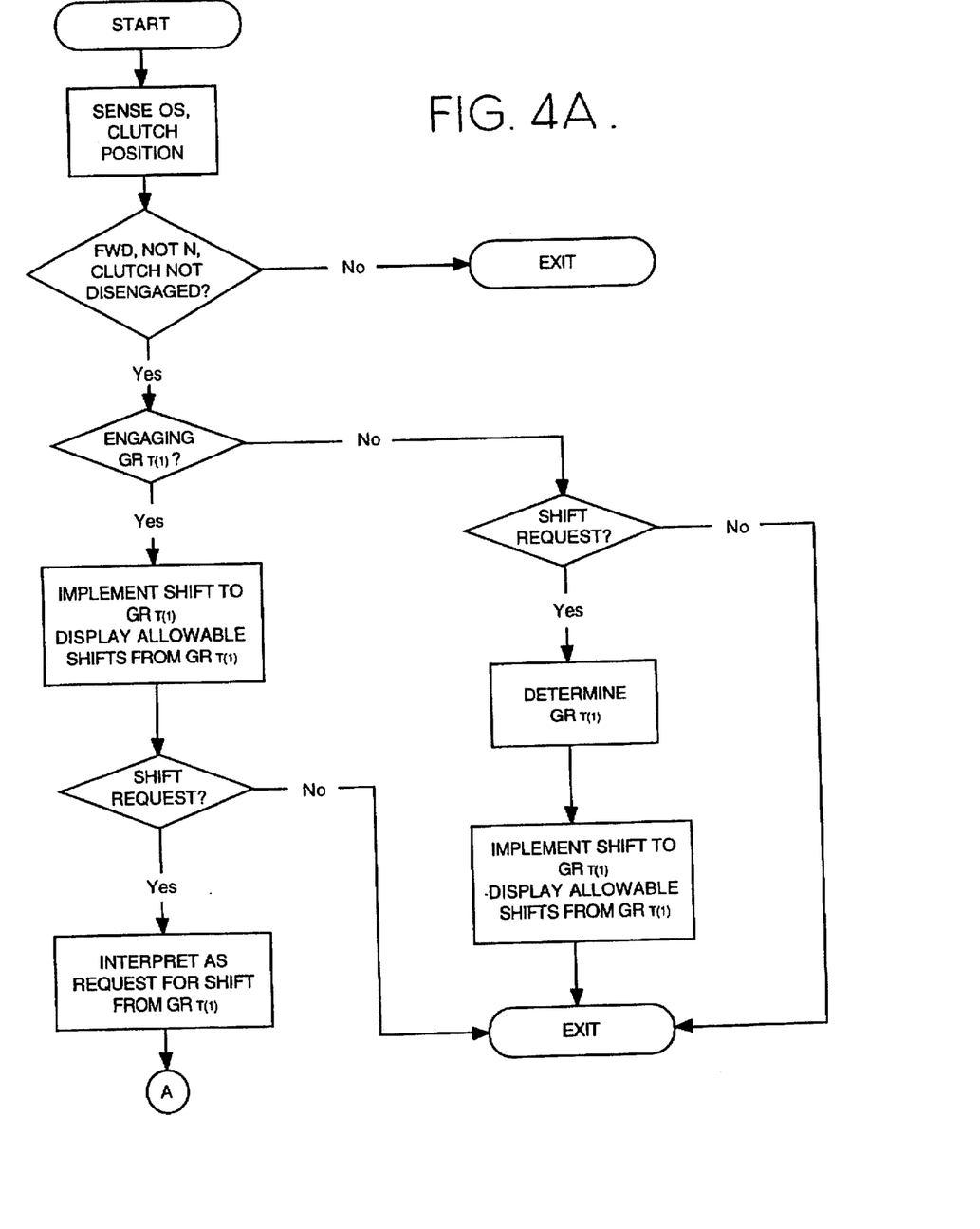
FIGS. 4A and 4B are a schematic illustration, in the form of a flow chart, of the control system/method of the present invention.
Figure 4B:
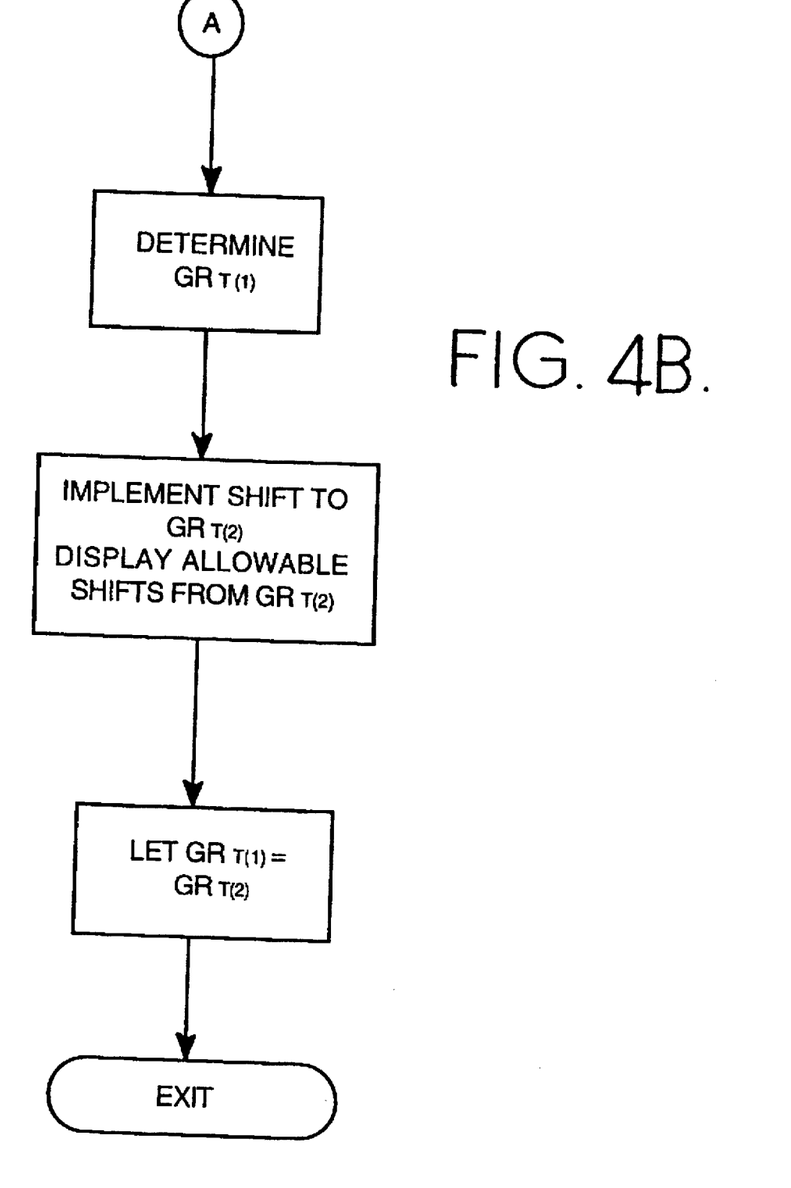

The control of the present invention is schematically illustrated in flow chart format in FIGS. 4A and 4B.

Accordingly, it may be seen that a control system/method for a semi-automated mechanical transmission is provided which is effective during automatic implementation of a shift from an engaged ratio to a selected target ($GR_T$), to cause the display to indicate allowable shifts from the target ratio and to interpret shift requests made during a shift transient as requests for upshifts and downshifts from the original target ratio ($GR_{T(1)}$) into a new target ratio ($GR_{T(2)}$) and to immediately cease operations to engage the original target ratio and commence operations to engage the latest target ratio.

Although the preferred embodiment of the present invention has been described with a certain degree of particularity, various changes to form and detail may be made without departing from the spirit and scope of the invention as hereinafter claimed.

We claim:

1. A method of controlling a vehicular semi-automatic mechanical change-gear transmission system (10) comprising a multi-speed change-gear mechanical transmission (12), a manually operated shift selection lever (1) movable in a first direction from a centered position to select upshifts and in a second direction from said centered position to select downshifts, a control display (2) having an upshift section (2') indicating a maximum number of upshifts from a base gear ratio under current vehicle operating conditions and a downshift section (2") indicating a maximum number of downshifts from said base gear ratio under current vehicle operating conditions, a central processing unit (38) for receiving inputs indicative of transmission input shaft rotational speed, of vehicle speed and of operation of said shift selection lever and for processing same according to predetermined logic rules to determine the currently allowably engaged gear ratios and to issue command output signals to non-manually controlled operators including a transmission operator (34) and to said control display, said method comprising:

if a shift from an engaged ratio into a selected target ratio ($GR_{T(1)}$) has been selected or is being implemented, causing said base gear ratio to equal said selected target ratio;

if a shift from a currently engaged ratio has not been selected or is not being implemented, causing said base gear ratio to equal said currently engaged ratio; and sensing for shift requests during a shift into a selected target ratio ($GR_{T(1)}$), interpreting said requests as requests for a specific shift from the initial selected target ratio ($GR_{T(1)}$) into a later selected target ratio ($GR_{T(2)}$), and immediately initiating a shift into said later selected ratio.

2. A method of controlling a vehicular semi-automatic mechanical change-gear transmission system (10) comprising a multi-speed change-gear mechanical transmission (12), a manually operated shift selection lever (1) movable in a first direction from a centered position to select upshifts and in a second direction from said centered position to select downshifts from a base gear ratio, a central processing unit (38) for receiving inputs indicative of transmission input shaft rotational speed, of vehicle speed and of operation of said shift selection lever and for processing same according to predetermined logic rules to determine the currently allowably engaged gear ratios and to issue command output signals to non-manually controlled operators including a transmission operator (34), said processing unit sensing operation of said manual shift selection lever including the direction of movement thereof; said method comprising:

if a shift from an engaged ratio into a selected target ratio ($GR_{T(1)}$) has been selected or is being implemented, causing said base gear ratio to equal said selected target ratio;

if a shift from a currently engaged ratio has not been selected or is not being implemented, causing said base gear ratio to equal said currently engaged ratio; and regardless of an existing request or of an ongoing implementation of a shift into a previously selected, permissibly engaged target ratio ($GR_{T(1)}$), upon a later shift request to a permissibly engaged target ratio ($GR_{T(2)}$), immediately commanding implementation of a shift into the later selected, permissibly engaged target ratio.

3. The method of claim 2, further comprising determining the target transmission gear ratio selected by the operator to be shifted directly into from the base gear ratio by assuming each repetition of displacement from the centered position of said shift selection lever in a given direction indicates operator selection of a change of one additional consecutive ratio in said direction.

4. A system for controlling a vehicular semi-automatic mechanical change-gear transmission system (10) comprising a multi-speed change-gear mechanical transmission (12), a manually operated shift selection lever (1) movable in a first direction from a centered position to select upshifts and in a second direction from said centered position to select downshifts from a base gear ratio, a central processing unit (38) for receiving inputs indicative of transmission input shaft rotational speed, of vehicle speed and of operation of said shift selection lever and for processing same according to predetermined logic rules to determine the currently allowably engaged gear ratios and to issue command output signals to non-manually controlled operators including a transmission operator (34), said processing unit sensing operation of said manual shift selection lever including the direction of movement thereof and the number of displacements of said lever within a first predetermined period of time from said centered position, and, in a first mode of operation, determining the transmission gear ratio selected by the operator to be shifted directly into from the base gear ratio by assuming each repetition of displacement from the centered position of said shift selection lever in a given direction indicates operator selection of a change of one additional consecutive ratio in said direction; said system comprising:

means for causing said base gear ratio to equal a currently engaged ratio if a shift from the currently engaged ratio has not been selected and for causing said base gear ratio to equal a selected target ratio if a shift into said selected target ratio is selected; and means effective, regardless of an existing selection or an ongoing implementation to engage a previously selected, permissibly engaged target ratio ($GR_{T(1)}$), to respond to a later selection to engage a permissibly engaged target ratio ($GR_{T(2)}$) by discontinuing implementation of engaging said previously selected, permissibly engaged target ratio ($GR_{T(1)}$) and commanding implementation of engaging said later selected, permissibly engaged target ratio ($GR_{T(2)}$).

5. A method of controlling a vehicular semi-automatic mechanical change-gear transmission system comprising a multi-speed change-gear mechanical transmission and a fuel-controlled engine, a manually operated shift selection device movable in a first direction from a centered position to select upshifts and in a second direction from said centered position to select downshifts from a base gear ratio, a central processing unit for receiving inputs indicative of transmission input shaft rotational speed, of vehicle speed and of operation of said shift selection device and for processing same according to predetermined logic rules to determine ,currently engaged and selected target gear ratios and to issue command output signals to system operators including an engine fuel controller, said processing unit sensing operation of said manual shift selection lever including the direction of movement thereof; said method comprising:

if a shift from an engaged ratio into a selected target ratio ($GR_{T(1)}$) has been selected or is being implemented, causing said base gear ratio to equal said selected target ratio;

if a shift from a currently engaged ratio has not been selected or is not being implemented, causing said base gear ratio to equal said currently engaged ratio; and regardless of an existing request or of an ongoing implementation of a shift into a previously selected target ratio ($GR_{T(1)}$), upon a later shift request to a permissibly engaged target ratio ($GR_{T(2)}$), immediately commanding implementation of a shift into the later selected target ratio.

6. A system for controlling a vehicular partially automated mechanical change-gear transmission system comprising a multi-speed change-gear mechanical transmission, a fuel-controlled engine, a manually operated shift selection lever movable in a first direction from a centered position to select upshifts and in a second direction from said centered position to select downshifts from a base gear ratio, a central processing unit for receiving inputs indicative of transmission input shaft rotational speed, of vehicle speed and of operation of said shift selection lever and for processing same according to predetermined logic rules to determine currently engaged and selected target gear ratios and to issue command output signals to non-manually controlled operators including an engine fueling controller, said processing unit sensing operation of said manual shift selection lever including the direction of movement thereof for determining the target gear ratio selected by the operator to be shifted into from the base gear ratio, said system comprising:

means for causing said base gear ratio to equal a currently engaged ratio if a shift from the currently engaged ratio has not been selected and for causing said base gear ratio to equal a selected target ratio if a shift into said selected target ratio is selected; and means effective, regardless of an existing selection or an ongoing implementation to engage a previously selected target ratio ($GR_{T(1)}$), to respond to a later selection to engage a different target ratio ($GR_{T(2)}$) by discontinuing implementation of engaging said previously selected target ratio ($GR_{T(1)}$) and commanding implementation of engaging said later selected target ratio ($GR_{T(2)}$).

7. The system of claim 6 wherein implementation to engage a target gear ratio includes controlling fueling of said engine.

* * * * *